United States Patent
Szucs et al.

(10) Patent No.: US 7,165,259 B2
(45) Date of Patent: Jan. 16, 2007

(54) DISTRIBUTED SOFTWARE APPLICATIONS IN THE HAVI HOME NETWORK

(75) Inventors: Paul Szucs, Ostfildern (DE); Matthias Mayer, Stuttgart (DE); Stephen Tiedemann, Stuttgart (DE); Sabine Terranova, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 505 days.

(21) Appl. No.: 10/097,093

(22) Filed: Mar. 12, 2002

(65) Prior Publication Data

US 2003/0033373 A1    Feb. 13, 2003

(30) Foreign Application Priority Data

Mar. 14, 2001  (EP)  ................................. 01106251

(51) Int. Cl.
  *G06F 9/00*  (2006.01)
(52) U.S. Cl. ........................ 719/328; 709/217
(58) Field of Classification Search ................ 719/328; 700/247; 709/217
  See application file for complete search history.

(56) References Cited

U.S. PATENT DOCUMENTS 6,185,682 B1 *  2/2001  Tang ........................... 713/168
6,253,238 B1 *  6/2001  Lauder et al. ............... 709/217
6,389,466 B1 *  5/2002  Zondag ....................... 709/221
6,600,958 B1 *  7/2003  Zondag ........................... 700/3
6,631,403 B1 * 10/2003  Deutsch et al. ............. 709/217

FOREIGN PATENT DOCUMENTS

EP            1 009 139          6/2000

OTHER PUBLICATIONS

Junko Yoshida, "1394 interoperability sill a no-show", Nov. 2000, EE times, pp. 1-6.*
"The HAVi Specification: Specification of the Home Audio/Video Interoperability (HAVi) Architecture" HAVi Specification, XX, XX, Nov. 19, 1998, pp. 1-384, XP002116332.

* cited by examiner

*Primary Examiner*—William Thomson
*Assistant Examiner*—Phuong N. Hoang
(74) *Attorney, Agent, or Firm*—Oblon, Spivak, McClelland, Maier & Neustadt, P.C.

(57) ABSTRACT

An extension to the HAVi specification is defined which enables the discovery and exchange of portable software elements, i.e. application modules (5a; 5b), within the HAVi home network in a defined way. In particular, the sharing of an application module (5a; 5b) between several controller devices (1a, 2a; 1b–3b) is enabled.

6 Claims, 3 Drawing Sheets

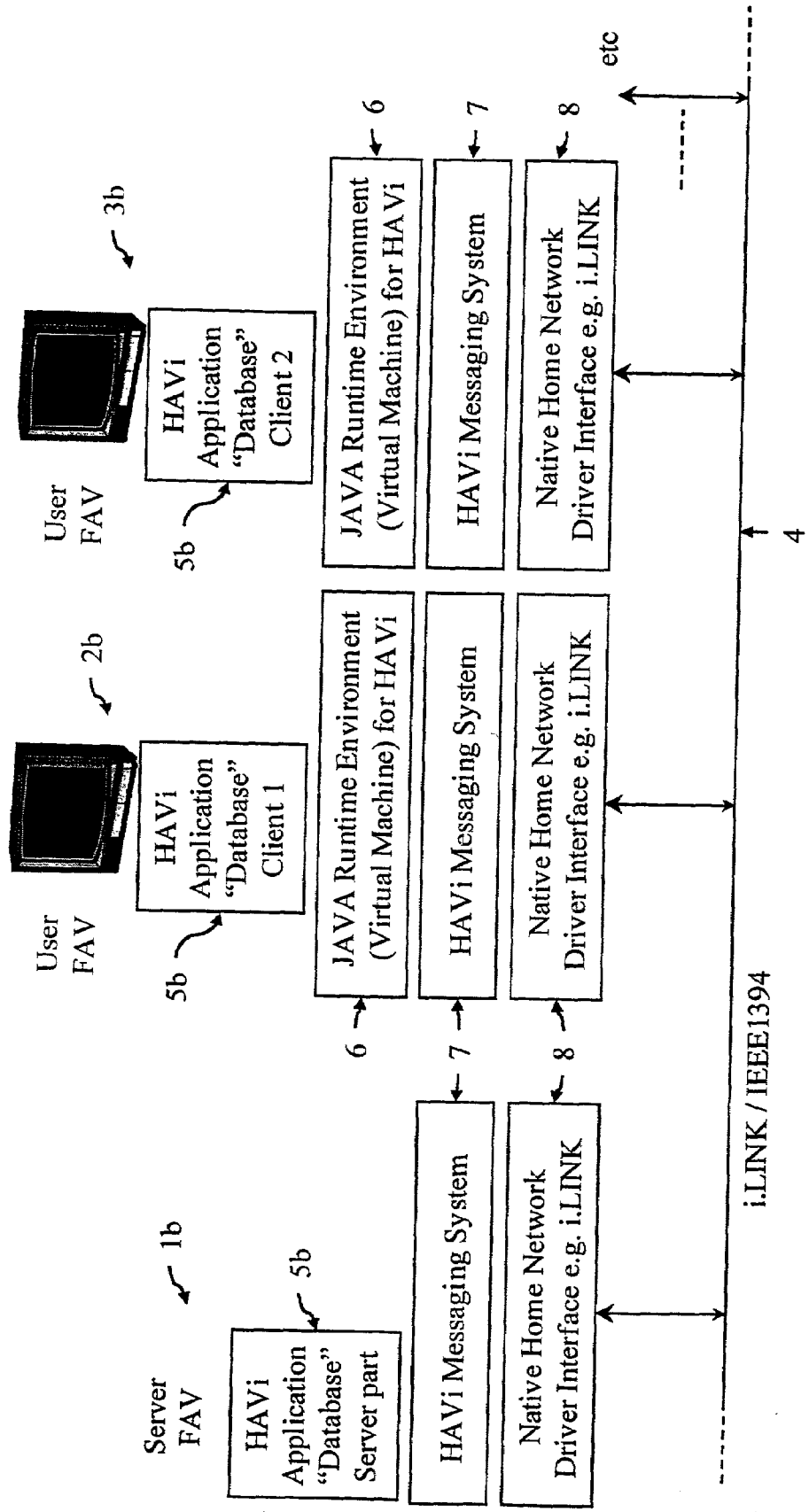

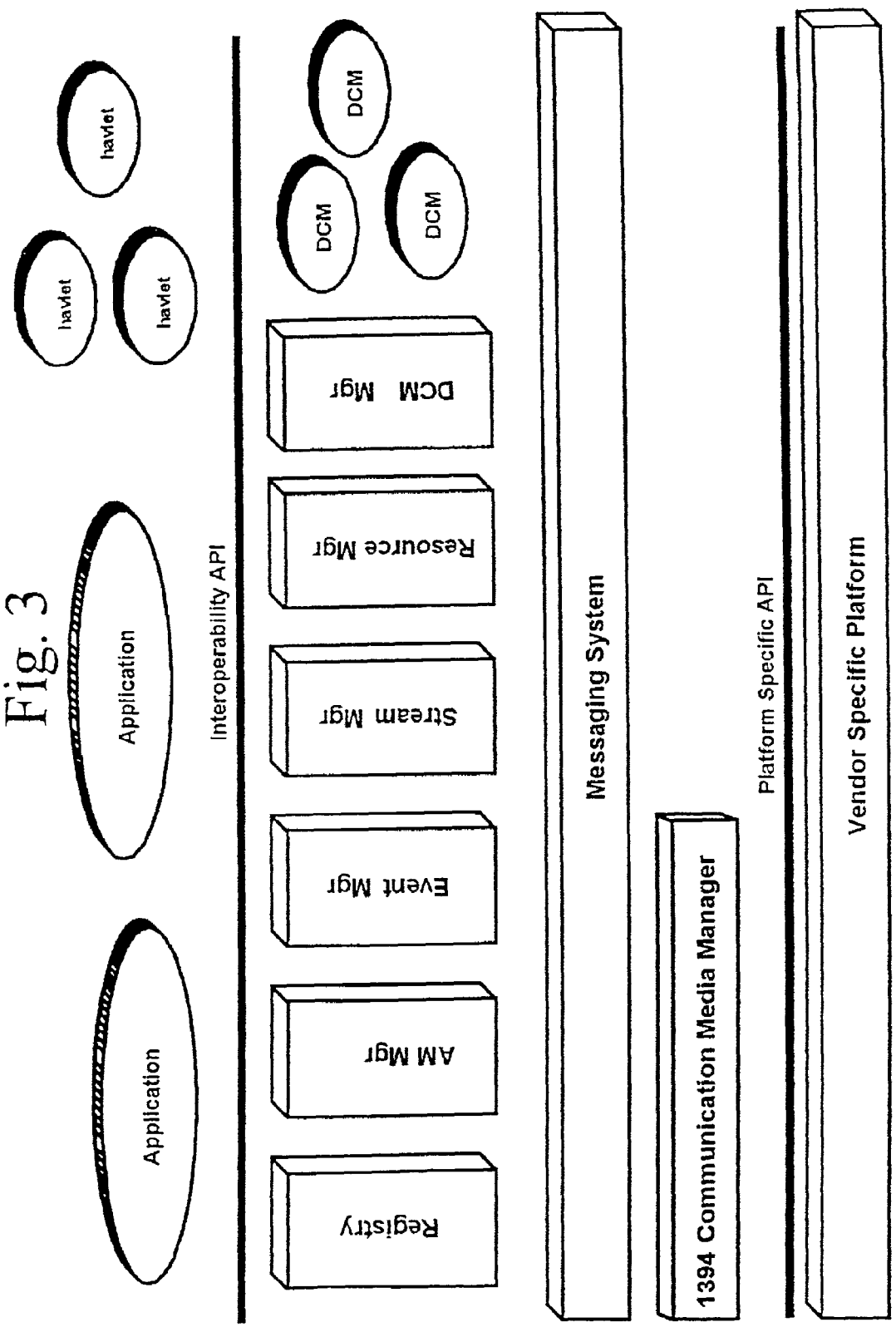

DISTRIBUTED SOFTWARE APPLICATIONS IN THE HAVI HOME NETWORK

The present invention concerns a method to handle an application module by a controller device within a network and means to carry out said method within the network. In particular, the present invention relates to a home network according to the HAVi specification, i.e. the specification of the home audio/video interoperability architecture.

BACKGROUND OF THE INVENTION

Generally, a HAVi network comprises several devices each of which can either be a controller device to control other devices or which can be a target device, e.g. a controllable device being controlled by a controller device. Further, the HAVi specification defines an environment for home network application software that runs independently on a single controller device which must be a Full AV device (FAV) in the network. This application can control target devices which might be Base AV devices (BAV) via their device control module (DCM). Target devices can provide their DCM and applications (havlets) which are uploaded to one controller device to be executed in order to control that target device. Applications can also be downloaded from outside the home network, e. g. via the internet, in order to update/upgrade device functionality, maintenance or other purposes.

The functionality of havlets and application modules is described in sections 3.5.3 and 3.9 of the HAVi SPECIFICATION 1.0, Version 1.0—Jan. 18, 2000 which content is herewith included by reference into this application. Section 3.9 describes that the way application modules are handled is proprietary as well as the way a FAV finds and installs third-party application modules which are supplied via a disk, internet or any other means. However, it is described that application modules are conceptionally similar to DCMs which allow havlets to use them to provide a proprietary application that offers an user interface for the control of a specific target device.

Further, in the introductory part of section 3.5 it is set out for the handling of a DCM code unit which is provided by a BAV target device that when a BAV target device is attached to a HAVi network with one or more FAVs, one of them uploads and installs the DCM code unit to make the BAV target device available to other HAVi components.

Since the HAVi specification does not show how to handle an application module by a controller device within the network it is the object underlying the present invention to provide such a method and means which can carry out said method.

BRIEF SUMMARY OF THE INVENTION

The method according to the present invention is defined in independent claim 1. Preferred embodiments thereof are defined in dependent claims 2 to 8. Means which are able to carry out said method are defined in claims 9 to 12.

The method to manage application modules within a controller device of a network according to the invention is characterized by the steps of maintaining a database of application modules provided by said controller device and allowing access to said database via the network; and providing application program interfaces for managing behaviour of application modules provided by said controller device and provided by other controller devices within the network to said controller device.

Therewith, the present invention provides the concept of application modules which can be shared by more than one controller device within the network. According to the above mentioned HAVi specification the distribution of applications among multiple controller devices (FAVs) in the network is not provided for havlets or for application modules that are not bound to the control of a particular network target device.

In this context "sharing" can mean:
- to concurrently execute an application module independently on more than one controller device,
- to concurrently execute an application module on more than one controller device so that an interaction in-between the controller devices executing said application module is performed based on said application module,
- an application-specific user interaction which means that a controller device which provided or first executed the application module acts as a server and all other controller devices which executed the application module thereafter act as clients, and/or
- an application module uses a common data base stored somewhere in the network.

Examples of such applications could be an A/V intercom or multi-user video games. Also Back-office applications will be possible, e.g a family document repository with multiple access from several devices in the Home Network. An Application Programming Interface (API) as a definitin of a basic life-cycle management API for the latter example might also be adopted in DVB-J, MHP (Multimedia Home Platform) which has the purpose of managing several applications on a (lone) MHP receiver, (Reference to these standards can be found on the DVB homepage.

Therewith, according to the invention shared applications might be distributed among multiple controller devices in the network in that they are stored on one controller device and might be loaded by other controllers, also passing an application module from one controller to other controllers within the network is possible.

Said behaviour of an application module might comprises import/export, execution and termination of said application module.

Preferrably the method according to the invention further comprises the step of listing all application modules which are available within the network and providing said list to said controller device.

Therewith all controller devices within the network know which different applicattion modules are available within the network to be able to load, execute and terminate them.

In case said network is a HAVi network said application modules are preferrably havlets which are HAVi level-2 GUI compliant, i.e. which have a graphical user interface according to HAVi level-2.

Further preferrably in case said network is a HAVi network the method according to the invention additionally comprises the step of controlling the exposure and loading of an application module similar to the control of a device control module manager for device control module code modules, but allowing a sharing of an application module between more that one controller device within said network.

Therewith it is secured that application modules which are managed according to the present invention are basically treated in a manner which is familiar within HAVi.

This method according to the present invention can be carried out by an application control manager which might be realized as hardware or as a computer program which might be stored on a computer accessible storage means.

Preferably, said application module manager has to be executed by a FAV to enable the FAV to share application modules. In this case all the functionality according to the present invention described above is available within the respective FAV.

Further objects, features and advantages of the present invention will be better understood from the following description of examples for shared applications in a HAVi network and a preferred embodiment of the invention taken in conjunction with the accompanying drawings, wherein

BRIEF DESCRIPTION OF THE SEVERAL VIEWS OF THE DRAWINGS

FIG. 2 shows an example of a client-server application in HAVi, and

FIG. 3 shows the new HAVi FAV Architectural Diagram including the Application Module Manager (AMM) according to the present invention.

DETAILED DESCRIPTION OF THE INVENTION

Figure 1:
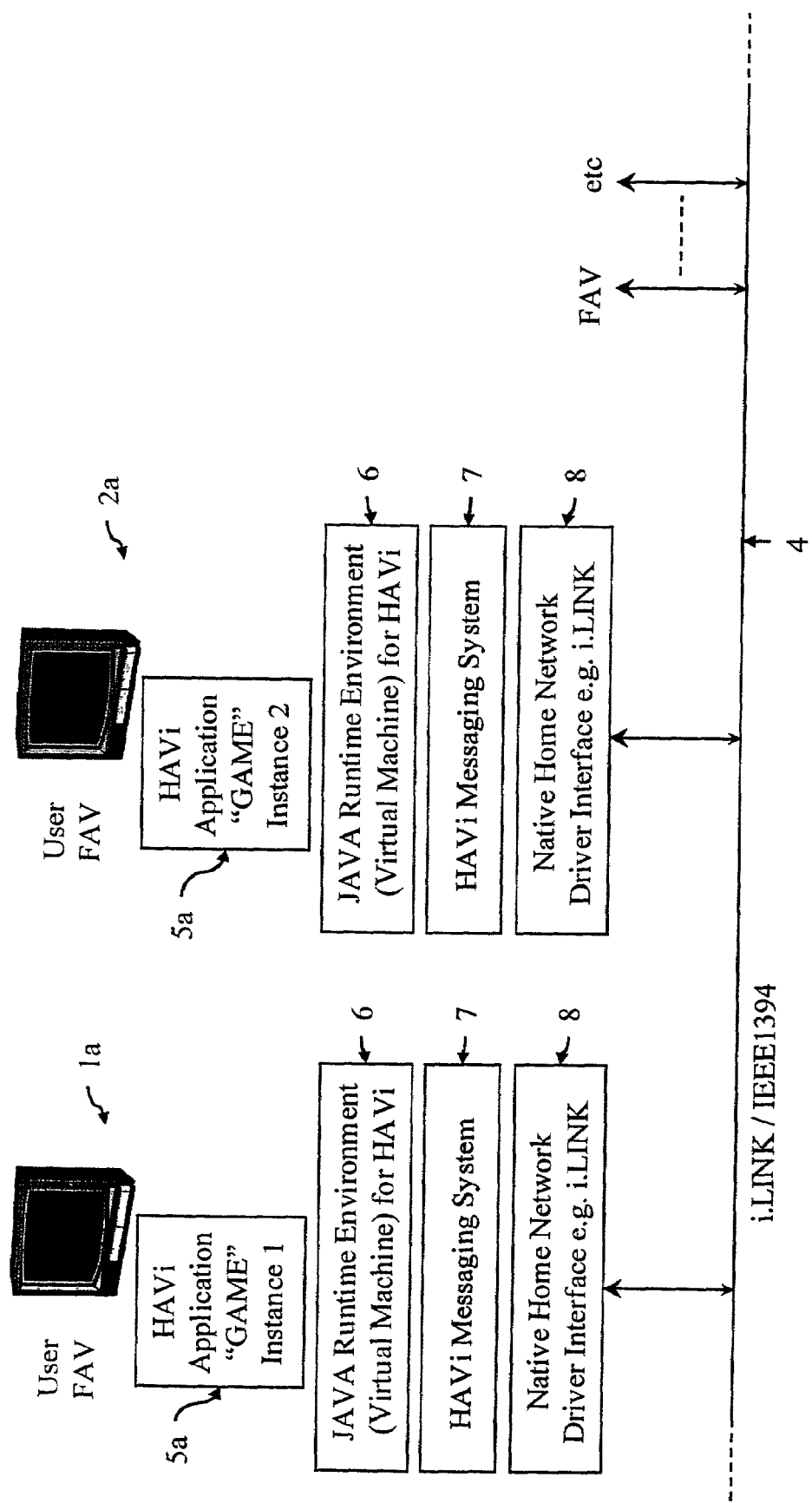
FIG. 1 shows an example of a multi-user application in HAVi.

As a first example FIG. 1 shows two users 1a, 2a of an i.LINK/IEEE1394 based HAVi network, namely a first user FAV 1a and a second user FAV 2a which are exemplary pictured as television sets. Further, the network bus 4, i.e. an i.LINK/IEEE1394 serial bus, might connect several other users, e.g. a further FAV.

Each of the users is HAVi compliant, i.e. since the first and the second users 1a, 2a are Full AV devices they can execute HAVi applications and communicate through the serial bus 4 via a runtime environment 6 (virtual machine) for HAVi, e.g. written in JAVA, a HAVi messaging system 7 and a native home network driver interface 8, e.g. an i.LINK interface, respectively comprised within each of said first and second users 1a, 2a.

It is shown that the first and second users 1a, 2a execute the same HAVi application module 5a, namely an application "GAME", i.e a shared application. The HAVi application 5a named "GAME" is treated as a first instance by the first user 1a and as a second instance by the second user 2a.

In this context instance could either mean that the actual execution is independent from each other, i.e. each user independently executes the application, or that the users interact with each other on basis of said application, i.e. that a multi-user application is executed.

The second example of a shared application depicted in FIG. 2 shows a client-server application in an i.LINK/IEEE1394 based HAVi network which comprises—among possible other devices—three full AV devices, namely a server 1b, a third user 2b and a fourth user 3b. Equal to the first and second users 1a, 2a shown and described in connection with FIG. 1 the third and fourth users 2b, 3b actually execute one HAVi application 5b and can communicate through the serial bus 4 via a runtime environment 6 (virtual machine) for HAVi, e.g. written in JAVA, a HAVi messaging system 7 and a native home network driver interface 8, e.g. an i.LINK interface, respectively comprised within each of said hird and fourth users 2b, 3b. The server 1b does not comprise a runtime environment 6 (virtual machine) for HAVi, but the actually executed HAVi application 5b might communicate directly through the HAVi messaging system 7 and the native home network driver interface 8 of the server 1b with the serial bus 4.

As described in connection with the first example of a shared application all shown FAVs, i.e the server 1b, the third user 2b and the fourth user 3b, execute the same application module 5b, in this case an application "Database". In particular the server 1b executes the application 5b "Database" as the server part of a database and the third and fourth users 2b and 3b which are again exemplary depicted as TV-set also execute the HAVi application 5b "Database", but as a first client and a second client, respectively.

Of course, all application instances (multi-user) or components (client-server) communicate using the HAVi messaging system. The types and contents of messages are proprietary to the respective application.

In the following a possible extension to the HAVi SPECIFICATION 1.0, Version 1.0—Jan. 18, 2000 is exemplary given as a preferred embodiment of the invention to further elucidate the method of the invention as described above. Within this example portions of the existing HAVi specification which would be extended or after which new parts would be inserted are indicated.

1.1 New HAVi FAV Architectural Diagram Including AMM (amendment to section 2.4.4 of the above mentioned HAVi specification)

The new HAVi FAV Architectural Diagram Including AMM is depicted in FIG. 3 which shows the AMM according to the present invention on the same layer as the Registry, Event Manager, Stream Manager, Recource Manager, DCM Manager and the DCMs.

1.2 Application Module (amendment to section 3.9 of the above mentioned HAVi specification)

The Application Module (AM) API is extended to provide defined API calls and events to manage the life cycle of HAVi applications.

ApplicationModule::Execute

ApplicationModule::Terminate

AM's must indicate changes in their state via the events:

ApplicationModuleStarted

ApplicationModuleTerminated 1.3 Application Module Manager (would be new section 3.10 within the above mentioned HAVi specification)

The Application Module Manager (AMM) provides a defined framework for the management of application modules (AM's) in HAVi. The method of introducing Application Modules (AM's) to the network, i.e. to an FAV node, is proprietary, but once an AM is present on any FAV node, the AMM on that FAV enables the AM to be used by other FAV's in the network.

The AMM provides the mechanism for AM discovery and execution for the FAV in which an AMM is hosted. Each AMM maintains a database of AM's available at that FAV and provides API's for managing the behaviour of both these AM's and AM's provided on another FAV, made available via the AMM on that FAV. Behaviour basically consists of the import/export (within HAVi), execution and termination of an AM.

The AMM lists AM's which are available in the network Only when an AM is launched in an FAV does a corresponding entry in the HAVi Registry become established.

The AMM is an optional module for FAV nodes only. Each FAV that wishes to be able to run AM's hosted on another FAV, or to host AM's to be shared in the network, must implement the AMM.

The AMM enables the provision of networked and device-independent AM's. Due to the proprietary nature of the internals of an AM, the concept of launching an AM from a remote FAV is specific to that AM. For example, the AM instance launched on the FAV which provided the AM originally could act as a server, and each launch of that AM from a remote FAV could instantiate the client part of that application, thus realising a client/server type of application. Alternatively, all instantiations of an AM could be identical, but could interact with eachother, to enable multi-user networked applications. AM instances would communicate with eachother via the HAVi messaging system. The message contents are proprietary, so that HAVi messages between AM's are meaningful only within the realm of the original AM.

1.4 Application Module Manager (would be inserted as section 5.12 into the above mentioned HAVi specification, which implies that sections 5.12, 5.13, and 5.14 of the HAVi SPECIFICATION 1.0 would be renumbered)

| Services Provided | | | | |
|---|---|---|---|---|
| Service | Comm Type | Locality | Access | Resv Prot |
| AMManager::ExecApplicationModule | M | local | | |
| AMManager::GetApplicationModules | M | global | | |
| AMManager::GetApplicationModuleAttributes | M | global | | |
| AMManager::InstallApplicationModule | M | global | trusted | |
| AMManager::KillApplicationModule | M | local | | |
| AMManager::TransferApplicationModule | M | global | | AMM |
| AMManager::UninstallApplicationModule | M | global | trusted | |
| AmInstallIndication | E | global | | |
| AmUninstallIndication | E | global | | |
| AmExecIndication | E | global | | |
| AmKillIndication | E | global | | |
| Application Module Manager Data Structures | | | | |

ApplicationModuleAttributes

```
struct {
    wstring  applicationModuleName;
    wstring  platformName;
    wstring  vendor;
    wstring  description;
    Icon     applicationModuleIcon;
};
```

Description

The ApplicationModuleAttributes structure is used to characterize the attributes of an Application Module.

The platformName attribute is used only to applications that do not run on the standard FAV. This allows proprietary or platform-specific applications to be recognized (or ignored) in HAVi. If the platformName is an empty string the standard HAVi-platform is used.

ApplicationModuleList typedef sequence<HUID>ApplicationModuleList;

DESCRIPTION

The ApplicationModuleList contains a list of Application Modules HUID's.

Application Module Manager API

AMManager::ExecApplicationModule

Prototype

Status AMManager::ExecApplicationModule(in HUID huid, out SEID seid)

Parameters huid—identifies the Application Module seid—the SEID of the running Application Module Description AMManager::ExecApplicationModule loads and executes (starts) the Application Module. The SEID of the running (registered) Application Module is returned.

If the Application Module could not be found an error is returned. An error will also be returned if the Application Module is not executable, for example if it is not compatible with the platform from where it was called or the execution failed.

Error codes

AMManager::ENOT_EXECUTABLE—the Application Module is not executable on this FAV

AMManager::ENOT_FOUND—the Application Module could not be found

AMManager::EAM_EXECTUTION_FAILED—Application Module is now not executable

AMManager::LOADING_FAILED—Application Module is not loadable

AMManager::GetApplicationModules

Prototype

Status AMManager::GetApplicationModules(out ApplicationModuleList applicationModuleList)

Parameters applicationModuleList—the list of the HUID's of Application Modules

Description

AMManager::GetApplicationModules returns a list of only the Application Modules HUID's. The list contains the local HUID's if it is a global call or it contains the HUID's of all Application Modules which are in the network if it is a call from the local AMManager. If there are not any Application Modules within the network an empty list will be returned.

AMManager::GetApplicationModuleAttributes
  Prototype
    Status AMManager::GetApplicationModuleAttributes (in HUID huid, out ApplicationModuleAttributes applicationModuleAttributes)
  Parameters
    huid—the HUID of the Application Module
    applicationModuleAttributes—contains the attributes of the Application Module
  Description
    AMManager::GetApplicationModuleAttributes returns the attributes of the Application Module specified by its HUID.
  Error codes
    AMManager::ENOT_FOUND—the Application Module could not be found AMManager::InstallApplicationModule
  Prototype
    Status AMManager::InstallApplicationModule(in sequence<octet>applicationModule, out HUID huid)
  Parameters
    applicationModule—the Bytecode of the Application Module
    huid—identifies the Application Module
  Description
    AMManager::InstallApplication installs the Application Module on the FAV. After installing the code the Application Module is presented in the Application Module List which is be held by the FAVs Application Module Manager. With GetApplicationModule it is possible to get this list.
  Error codes
    AMManager::ENOT_FOUND—the Application Module could not be found
    AMManager::ENOT_ENOUGH_MEMORY—there is not enough memory left
    AMManager::EACCESS_VIOLATION—the caller of an API does not have permission to perform the operation.

AMManager::KillApplicationModule
  Prototype
    Status AMManager::KillApplicationModule(in SEID seid)
  Parameters
    seid—identifies the running Application Module
  Description
    AMManager::KillApplicationModule kills a running Application Module. The SEID of the Application Module will be removed from the Registry. The kill command is intented to be used only in exceptional circumstances, for example when the Application Module is not longer responding.
  Errorcodes
    AMManager::ENOT_FOUND—the Application Module could not be found
    AMManager::ENOT_POSSIBLE—the Application Module is not killable AMManager::TransferApplicationModule
  Prototype
    Status AMManager::TransferApplicationModule(in Huid huid, out sequence<octet>applicationModule)
  Parameters
    huid—identifies the Application Module
    applicationModule—the Bytecode of the Application Module
  Description
    AMManager::TransferApplicationModule returns the code of the Application Module identified by the HUID from the called AMManager to the calling AMManager.
  Error codes
    AMManager::ENOT_FOUND—the Application Module could not be found
    AMManager:: EACCESS_VIOLATION—the caller of an API does not have permission to perform the operation AMManager::UninstallApplicationModule
  Prototype
    Status AMManager::UninstallApplicationModule(in Huid huid)
  Parameters
    huid—identifies the Application Module
  Description
    AMManager::UninstallApplicationModule uninstall the Application Module. The Application Module will be deleted from the list that is held by the Application Module Manager.
  Error codes
    AMManager::ENOT_FOUND—the Application Module could not be found
    AMManager:: EACCESS_VIOLATION—the caller of an API does not have permission to perform the operation Application Module Manager Events AmInstallIndication
  Prototype
    void AmInstallIndication(in Huid huid)
  Parameters
    huid—identifies the new Application Module
  Description
    The AMManager generates this event after installing the Application Module on the FAV.

AmUninstallIndication
  Prototype
    void AmUninstallIndication(in Huid huid)
  Parameters
    huid—identifies the uninstalled Application Module
  Description
    This event is generated when an Application Module is been uninstalled.

AmExecIndication
  Prototype
    void AmExecIndication(in Seid seid)
  Parameters
    seid—identifies the running Application Module
  Description
    After an Application Module is started the event AmExecIndication is send.

AmKillIndication
  Prototype
    void AmKillIndication(in SEID seid)
  Parameters
    seid—identifies the killed Application Module
  Description
    Killing an Application Module causes this event.

What is claimed is:
1. A controller device of a home audio/video interoperability (HAVi) network, comprising:
  a database for storing application modules, the application modules not being bound to a particular controller device;

an application module manager comprising:
- a handler configured to handle at least some application module specific tasks of application modules stored within said database; and
- an Application Module Manager (AMM)-application program interface enabling a further controller device of said HAVi network to access said handler said application module manager being included within the same HAVi architecture layer as the corresponding device control manager of said controller device;

wherein said handler enables control of exposure and loading processes of an application module similar to the control of a device control module manager for device control module code modules, but allowing a sharing of an application module between more than one controller device within said network, said sharing includes concurrently executing an application module independently on more than one controller device, concurrently executing an application module on more than one controller device so that an interaction in-between the controller devices executing said application module is performed based on said application module; and a controller device which provided or first executed the application module acts as a server and all other controller devices which executed the application module thereafter act as clients; and/or an application module employs a common database stored in the network.

2. The controller device according to claim 1, wherein said handling functionality comprises import/export, execution, and terminal processes of said application modules.

3. The controller device according to claim 1, wherein said handling functionality enables to determine which application modules are available within the HAVi-network.

4. The controller device according to claim 1, wherein said application modules are havlets which are HAVi level-2 GUI compliant.

5. The controller device according to claim 1, wherein said application module manager is an instruction set loadable into said controller device.

6. A computer program, stored on a computer-readable medium, comprising program code that when executed on a controller device causes the controller to implement a method of interpreting HAVi devices, comprising:
- handling by a handling functionality of an application module manager at least some application module specific tasks of application modules not being bound to a particular controller device and stored within a database;
- executing a corresponding Application Module Manager (AMM)-application program interface comprised in said application module manager for enabling a further controller device of a home audio/video interoperability (HAVi) network to access said handling functionality, wherein said application module manager is included within the same HAVi architecture layer as a corresponding device control manager of said controller device;
- enabling by said handling functionality the control of exposure and loading processes of an application module similar to controlling of a device control module manager for device control module code modules, but allowing a sharing of an application module between more than one controller device within the network, wherein said sharing includes:
- concurrently executing an application module independently on more than one controller device;
- concurrently executing an application module on more than one controller device so that an interaction in-between the controller devices executing said application module is performed based on said application module;
- providing an application-specific user interaction in which a controller device which provided or first executed the application module acts as a server and all other controller devices which executed the application module thereafter act as clients; and/or
- utilizing a common database stored in the network together with an application module.

* * * * *